Sept. 15, 1970  C. R. BINDER  3,528,260
REFRIGERATION APPARATUS WITH COMPONENTS CONNECTED BY
CHLORINATED POLYETHYLENE HOSES
Filed Aug. 30, 1968

INVENTOR.
Charles R. Binder
BY
George A. Grove
ATTORNEY

# United States Patent Office 3,528,260
Patented Sept. 15, 1970

3,528,260
REFRIGERATION APPARATUS WITH COMPONENTS CONNECTED BY CHLORINATED POLYETHYLENE HOSES
Charles R. Binder, Romeo, Mich., assignor to General Motors Corporation, Detroit, Mich., a corporation of Delaware
Filed Aug. 30, 1968, Ser. No. 756,543
Int. Cl. F25b 1/00
U.S. Cl. 62—498                              6 Claims

ABSTRACT OF THE DISCLOSURE

An automotive air conditioner is disclosed as a preferred embodiment of the invention wherein the functional components of the apparatus are connected by chlorinated polyethylene hoses. Chlorinated polyethylene is suitable for prolonged usage in an automobile engine compartment and is particularly desirable in an air conditioner hose because it is highly impermeable to the conventionally employed Freon-type refrigerant fluids.

---

Figure 1:
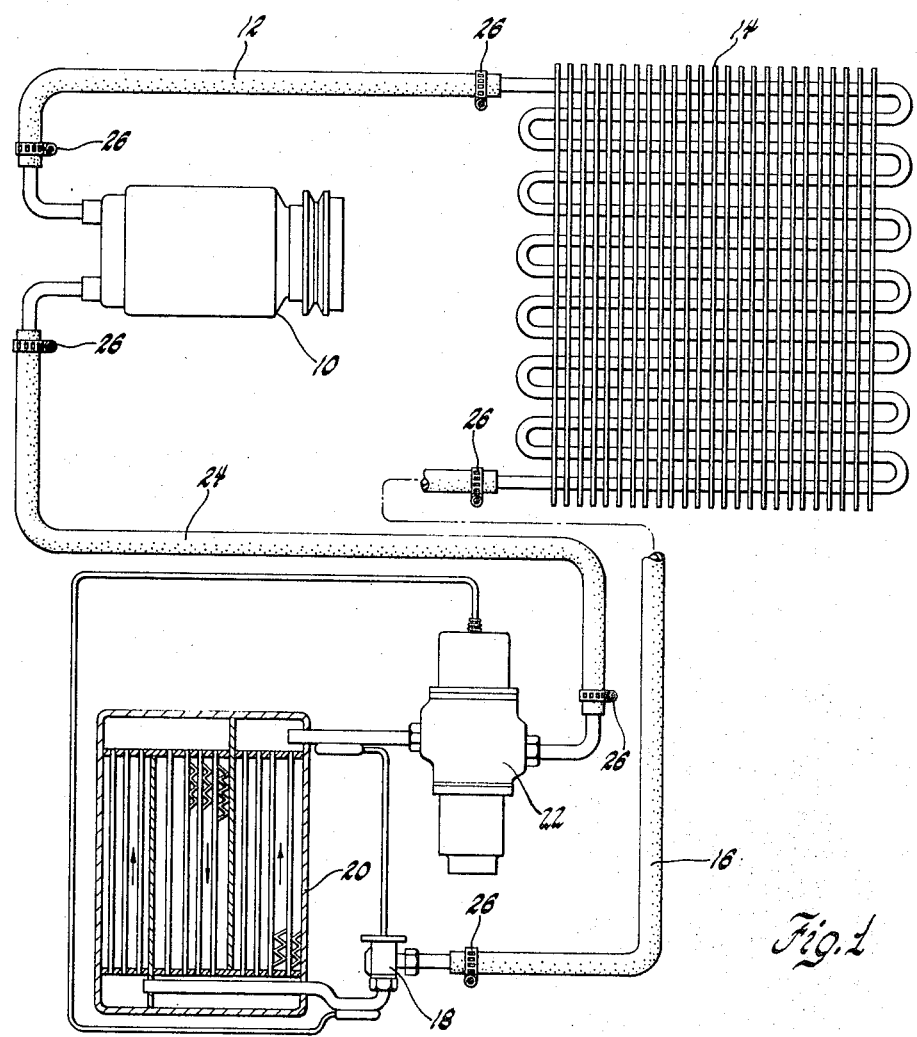

This invention relates to refrigeration apparatus and more particularly it relates to automobile air conditioners wherein hoses or other suitable flexible conduit members are employed for the purpose of joining the principal operating components of the refrigerating device and containing the working fluid in a closed refrigerant flow circuit. While Freon-type fluoro-halo derivatives of aliphatic hydrocarbons are widely used in refrigeration devices because of their low toxicity and other suitable properties, the containment of these fluids within the refrigeration circuit has always been a problem. In household refrigerators the refrigerant conduits connecting the compressor, condenser, evaporator and the like are usually formed of a suitable metal such as aluminum or steel, and the individual conduits are connected to the respective operating components by welding or brazing. In this way the entire refrigeration circuit is hermetically sealed and little or no refrigerant fluid escapes even over a period of years. However, there are many applications in which the arrangement of refrigerator components, the operating environment, and/or method of assembly preclude the use of metallic welded-in-place connector tubing. Examples of such refrigeration applications include automobile air conditioners and certain large commercial refrigeration units in which some components such as the compressor and condenser are remote from the other operating components.

In these latter refrigeration applications and particularly in automobile air conditioners, the working components of the refrigeration device are typically connected by means of a suitable rubber hose. For example, a major portion of air conditioner hose presently employed in automobile air conditioners is a three-layer structure. The innermost tubular layer of the hose is formed of an elastomeric material intended to keep the refrigerant working fluid and compressor lubricant in the hose and moisture and air out. Since the refrigeration apparatus is subjected to greater than atmospheric pressures by the refrigerant, a layer of reinforcing braiding is wound upon the outside surface of the inner tube. An outer layer of elastomer resistant to ozone, engine oil and other contaminating materials likely to be present in the engine compartment is typically extruded over the reinforcing braiding. In hose of this type the inner layer is acrylonitrile-butadiene rubber, the braiding fibers are rayon and the outer layer is neoprene. While acrylonitrile-butadiene rubber generally provides a relatively good barrier to the effusion of Freon refrigerants, some leakage does occur and it is sometimes necessary to replace some of the refrigerant after two or three years of use. The escape of Freon refrigerants from refrigeration units is generally not dangerous, but the refrigerant does have to be replaced and, therefore, the cost of operation and inconvenience associated with the machine is increased. Accordingly, it is recognized that it would be desirable to have hoses available for use in automobile air conditioners and the like which are much less permeable to Freon refrigerants.

It is an object of the present invention to provide a refrigeration apparatus having as basic functional components a compressor, a condenser and an evaporator all connected in a closed refrigerant flow circuit with one or more hoses formed of a major portion of chlorinated polyethylene.

It is a more specific object of the present invention to provide an automotive air conditioning apparatus using one of the conventional fluoro-halo aliphatic hydrocarbon refrigerants wherein at least the inner tubular layer of a hose employed in contact with the working fluid is formed of chlorinated polyethylene or of a blend of chlorinated polyethylene with a minor portion of another suitable synthetic elastomeric material.

In accordance with a preferred embodiment of my invention, these and other objects are accomplished by providing a refrigeration apparatus comprising a compressor, a condenser, and an evaporator together with other suitable operative refrigerator components and controls in a closed refrigerant flow relationship wherein two or more of the operating elements are connected by a hose formed of a major portion of cross-linked chlorinated polyethylene. In general, the hose is formed of an inner flexible tubular member which is in contact with the working fluid, a reinforcing layer of braided fibers and an outer elastomeric tubular layer which is suitably resistant to engine compartment contaminants. I have found that cross-linked chlorinated polyethylene is suitable for employment as the inner tubular layer as well as the outer elastomeric layer of a hose of the above-described structure. Cross-linked chlorinated polyethylene, preferably containing about 48% by weight chlorine, is substantially less permeable to Freon-type refrigerant fluids than is acrylonitrile-butadiene rubber or any other material heretofore considered for use in air-conditioner hoses.

I also found that a mixture of about 85–90 parts by weight of cross-linked chlorinated polyethylene with 10–15 parts by weight of a suitable cured elastomeric material such as acrylonitrile-butadiene rubber, chlorinated butyl rubber, neoprene, chlorosulfonated polyethylene or polyepichlorohydrin is also quite impervious to Freons and has the other physical and chemical properties required for use as air-conditioning hose. A mixture of chlorinated polyethylene with one or more of these elastomers may suitably be employed as at least the inner tubular layer of air-conditioner hose. Advantageously, however, the hose is completely formed of a single composition containing a major portion of cross-linked chlorinated polyethylene, except for the intermediate reinforcing sheet of suitable fibrous material.

Figure 2:
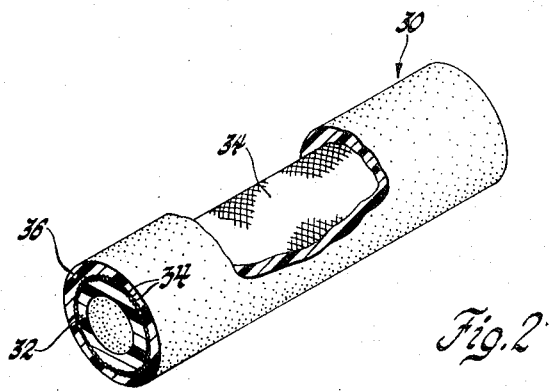

Other objects and advantages of my invention will become more apparent from a detailed description thereof reference being had to the attached drawing in which:

FIG. 1 is a diagrammatic representation of one type of refrigeration apparatus employing this invention, and FIG. 2 is a view of a section of air conditioner hose partly in section and partly broken away illustrating my invention.

Conventional automobile air-conditioning systems typically employ a compressor, a condenser, an extension valve, an evaporator and an evaporator pressure control valve connected in that order with suitable hosing to form a closed refrigerant flow circuit. Referring now to the diagram of FIG. 1, compressor 10 is a belt-driven device which is suitable for compressing the refrigerant vapor. The compressed refrigerant vapor is pumped from compressor 10 through flexible conduit 12 to condenser 14 which is a heat exchanger wherein the relatively high pressure vapor transfers heat to the atmosphere and becomes substantially completely liquefied. The condensed fluid flows from the condenser 14 through conduit 16 to expansion valve 18 through which it is permitted to expand under controlled conditions into evaporator 20. In the relatively low pressure environment of the evaporator core a major portion of the refrigerant quickly evaporates and undergoes a sharp reduction in temperature. As is well known, air may be blown around the tubes of the core and thereby cooled for a desired purpose. Refrigerant in the vapor state, or as a mixture of vapor and liquid, is controllably released from the evaporator through suction control valve 22. It flows through hose 24 back to the suction port of compressor 10. A more complete description of conventional automobile air-conditioning systems may be found in any of a number of textbooks on air conditioners or in automobile shop manuals.

The present invention is principally concerned with the means of connecting the principal functional components of a refrigeration device, such as are depicted in FIG. 1, in a closed refrigerant flow circuit. In the case of an automobile air conditioner the flexible conduits employed to connect various fixed operating components such as the compressor, condenser or the evaporator are synthetic rubber hoses. Members 12, 16 and 24 of FIG. 1 depict hoses or flexible conduits in accordance with my invention. As illustrated in FIG. 1, the hoses are bent at right angles, compactly arranged and not particularly drawn to scale. As is well recognized, the hoses in the typical automobile engine compartment meander in the most convenient path from one fixed operating component to another, the ends of the hoses being suitably clamped 26 to appropriate fittings on the fixed members.

In FIG. 2 is depicted a section of a hose 30 suitable for use in the present invention. As seen, the hose is a three-part structure comprising an inner tubular layer 32, a reinforcing braided layer 34 and an outer layer 36. In accordance with my invention the inner and outer layers are preferably formed of the same synthetic composition. However, in any event, at least the inner layer 32 consists of a composition selected from the group consisting of cured chlorinated polyethylene and mixtures of cured chlorinated polyethylene with a minor portion of chlorinated butyl rubber, acrylonitrile-butadiene rubber, neoprene, chlorosulfonated polyethylene and polyepichlorohydrin, the minor constituents making up no more than about 15% by weight of the mixture. The reinforcing braided layer 34 is made up of a suitable fibrous material such as rayon. The outer layer 36 is preferably formed of chlorinated polyethylene or one of the above-identified chlorinated polyethylene-containing mixtures, which material may be the same as the inner layer. Alternatively, the outer layer may be formed of neoprene or other suitable elastomeric material having good resistance to ozone, abrasion, high temperature and engine compartment contaminants such as oil and gasoline.

Chlorinated polyethylenes of varying chlorine contents are commercial products generally produced by chlorinating a powdered aqueous slurry of Ziegler polyethylene. Heretofore, these chlorinated polyethylenes have been used largely in mixtures with poly(vinyl chloride).

Material suitable for use in the subject refrigeration apparatus contains about 45–50% by weight chlorine and preferably about 48% by weight chlorine. The permeability of chlorinated polyethylene to Freons is substantially reduced by cross-linking, and only cross-linked material is deemed suitable for use in the subject apparatus. Cured chlorinated polyethylene is formed by mixing together, as for example on a two-roll mill or other suitable device, 100 parts by weight of chlorinated polyethylene and about eight parts by weight of a suitable cross-linking material such as 2-mercaptoimidazoline. The mixture of polymer and curing agent is molded at about 320° F. by extrusion under pressure into the form of a hose. The cured material is tough, durable and highly impervious to certain Freon-type fluoro-halo derivatives of aliphatic hydrocarbons of the character disclosed in the patent to Midgeley et al., Re. 19,265, reissued Aug. 7, 1934. Examples of these refrigerants include trichlorofluoromethane (Freon 11) and dichlorodifluoromethane (Freon 12). My air conditioner hosing is preferred for use in air conditioners in which dichlorodifluoromethane is employed as the refrigerant. My hosing is not preferred for use in combination with a refrigerant composed of a substance having a highly polar molecule such as difluoromonochloromethane.

Chlorinated polyethylene is readily mixed with and cured with chlorinated butyl rubber, acryonitrile-butadiene rubber, neoprene, chlorosulfonated polyethylene and polyepichlorohydrin, all known compositions. Small amounts of these materials, up to a maximum of about 10–15% by weight of the polymer mixture, in finely divided form are simply incorporated with the chlorinated polyethylene powder and crosslinking material on a suitable mill and then extruded at about 320° F. into the form of air-conditioner hose. The technique of extruding thermosetting synthetic elastomers into hose is well known.

In general, the manufacture of the subject air-conditioner hose is accomplished along the lines of conventional hose manufacture. The inner layer is extruded first. Reinforcing fiber is wound onto the outer surface in the form of a braid and then an outer protective layer is extruded over the reinforced inner layer. In a typical application the innermost tubular layer has an ID of about ½″ and is 3/16″ thick. The outer protective layer is about 1/16″ thick and the finished hose has an overall diameter of about 1″.

The desirability of employing cross-linked chlorinated polyethylene and/or mixtures of cross-linked chlorinated polyethylene with other suitable synthetic materials is more clearly demonstrated by the following summary of permeability data. In this summary permeability constants of a number of different materials have been evaluated with respect to Freon 12 refrigerant.

| Polymer composition | Temperature (° C.) | Permeability constant, cm.³ (STP)-cm. sec.-cm.²-cm. Hg |
|---|---|---|
| Chlorinated polyethylene (CPE), 40% chlorine | 23 | 0.0028×10⁻⁹ |
| CPE, 48% chlorine | 23 | (¹) |
| Acrylonitrile-butadiene (45% acrylonitrile) | 23 | 0.012×10⁻⁹ |
| CPE, 48% chlorine | 107 | 0.168×10⁻⁹ |
| Acrylonitrile-butadiene (45% acrylonitrile) | 102 | 0.444×10⁻⁹ |
| CPE, 48% chlorine—90 parts acrylonitrile-butadiene—10 parts | 105 | 0.229×10⁻⁹ |
| CPE, 48% chlorine—85 parts chlorinated butyl rubber—15 parts | 109 | 0.301×10⁻⁹ |
| CPE, 48% chlorine—85 parts chlorosulfonated PE—15 parts | 109 | 0.155×10⁻⁹ |

¹ No permeation after 11 days.

Permeability constants of the membranes of the above compositions were determined at a particular predetermined temperature by employing the following expression:

$$q = \frac{P \times A \times \Delta p}{t}$$

where:

$q$ = is the rate of gas permeation through the membrane in cm.³
$A$ = area exposed to the Freon in cm.²
$t$ = thickness of the membrane in cm.
$\Delta p$ = pressure differential in cm. of mercury
$P$ = permeability constant in $\frac{\text{cm.}^3 \text{ (STP)-cm.}}{\text{sec.-cm.}^2\text{-cm. Hg}}$ The above summarized permeability data was obtained by measuring the rate of Freon permeation through membranes of respective compositions by means of a permeability cell developed by the Tonawanda Laboratories of the Linde Co. and offered for sale by Custom Scientific Instruments, Inc. In general, the permeability cell consisted of two stainless steel discs each about 9/16" thick and 6" in diameter. Machined depressions in each disc formed a cylindrical cavity when the discs were superposed. A molded disc or membrane of each of the above cured materials approximately 5" in diameter and 0.020" thick was clamped between the two discs by means of six equally spaced bolts, a rubber gasket insuring a pressure-tight fit. The cell was supplied with an open-ended borosilicate glass capillary connected in a vertical position to an opening in the center of the upper disc. Suitable gas inlet and vent lines were provided on both sides of the cell.

Freon 12 gas was supplied at a constant superatmospheric pressure to the bottom of the cell, the cell and gas being maintained at a predetermined temperature. After permeating through the membrane, which was supported on the low pressure side by a sheet of filter paper, the gas expanded into the capillary. The capillary contained a short plug of mercury which was displaced upwardly by the permeating gas. Movement of the mercury plug offered a direct measure of the rate of permeation of the gas through the membrane. An S-shaped band in the base of the capillary prevented the mercury from falling inside the cell.

As shown in the table, cross-linked chlorinated polyethylene and mixtures of this polymer with certain other identified compositions, are substantially less permeable to Freon 12 than acrylonitrile-butadiene rubber. It is also seen that, in general, unalloyed cross-linked chlorinated polyethylene is less permeable with respect to fluoro-halo aliphatic hydrocarbons than the chlorinated polyethylene based mixtures. Usually the effect of adding one or more of the other specified elastomeric materials in amounts up to about 15% by weight of the resulting mixture is to increase the permeability of the mixture to Freons. Nevertheless, the permeabilities of the mixtures are lower than that of acrylonitrile-butadiene rubber.

The principal reasons for mixing materials such as chlorinated butyl rubber, chlorosulfonated polyethylene, neoprene or acrylonitrile-butadiene rubber with chlorinated polyethylene are to improve the low temperature properties and the processing characteristics of the latter material. Cross-linked chlorinated polyethylene has satisfactory resistance to ozone and to the high temperatures and chemical contaminants of the automobile engine compartment. However, it does tend to stiffen at about 0° C. Since portions of air conditioner systems wherein hoses are employed operate at temperatures below this level, it frequently is desirable to lower the stiffening temperature of chlorinated polyethylene when employed at hose material. Mixtures of chlorinated polyethylene and small amounts of the above-identified materials, up to about 15% by weight of the minor constituents, have stiffening temperatures which are substantially lower than that of cross-linked chlorinated polyethylene. The stiffening temperature is determined in accordance with ASTM Designation: D1043–61T entitled, "Stiffness Properties of Nonrigid Plastics as a Function of Temperature by Means of a Torsion Test." By means of this test the low temperature properties of specific hose materials within the above-stipulated ranges may be evaluated for a particular refrigeration application.

While my invention has been described in terms of a few specific embodiments thereof, it will be appreciated that other forms could readily be adopted by one skilled in the art and accordingly the scope of my invention should be considered limited only by the following claims.

I claim:

1. In a refrigeration apparatus comprising a compressor, a condenser and an evaporator connected together in a closed refrigerant flow circuit by means of conduit members, and a suitable halogenated aliphatic hydrocarbon refrigerant flowing within said circuit in the operation of said apparatus; the improvement wherein at least one of said conduit members is a hose formed of a major portion of cross-linked chlorinated polyethylene.

2. In a refrigeration apparatus comprising a compressor, a condenser and an evaporator connected together in a closed refrigerant flow circuit by means of conduit members, and a suitable halogenated aliphatic hydrocarbon refrigerant flowing within said circuit in the operation of said apparatus; the improvement wherein at least one of said conduits is a hose formed of a major portion of a material selected from the group consisting of cross-linked chlorinated polyethylene and mixtures of at least 85% by weight cross-linked chlorinated polyethylene with up to 15% by weight of a material selected from the group consisting of acrylonitrile-butadiene rubber, chlorinated butyl rubber, chlorosulfonated polyethylene, neoprene and polyepichlorohydrin.

3. In an automobile air conditioner comprising a compressor, a condenser and an evaporator connected together in a closed refrigerant flow circuit by means of conduit members, and a suitable halogenated aliphatic hydrocarbon refrigerant flowing within said circuit in the operation of said air conditioner; an improved conduit member which is a hose comprising an inner tubular refrigerant contacting layer having low permeability with respect to said refrigerant, an outer tubular layer of an engine oil- and moisture-resistant synthetic polymer and an intermediate layer of braided fibers adapted to reinforce said inner layer against the pressure exerted by said refrigerant, said inner layer being formed of a major portion of cross-linked chlorinated polyethylene.

4. In an automobile air conditioner comprising a compressor, a condenser and an evaporator connected together in a closed refrigerant flow circuit by means of conduit members, and a suitable halogenated aliphatic hydrocarbon refrigerant flowing within said circuit in the operation of said air conditioner; an improved conduit member which is a hose comprising an inner tubular refrigerant contacting layer having low permeability with respect to said refrigerant, an outer layer of an engine oil- and moisture-resistant synthetic polymer and an intermediate layer of braided fibers adapted to reinforce said inner layer against the pressure exerted by said refrigerant, said inner layer being formed of a material selected from the group consisting of a cross-linked chlorinated polyethylene and mixtures of at least 85% by weight cross-linked chlorinated polyethylene and up to 15% by weight of a material selected from the group consisting of acrylonitrile-butadiene rubber, chlorinated butyl rubber, chlorosulfonated polyethylene, neoprene and polyepichlorohydrin.

5. In an air conditioner comprising a compressor, a condenser and an evaporator connected together in a closed refrigerant flow circuit by means of conduit members, and a suitable halogenated aliphatic hydrocarbon refrigerant flowing within said circuit in the operation of said air conditioner; an improved conduit member which is a hose comprising an inner tubular refrigerant contacting layer having low permeability with respect to said refrigerant, an outer layer of an engine oil- and moisture-resistant synthetic polymer and an intermediate layer of braided fibers adapted to reinforce said inner layer against the pressure exerted by said refrigerant, said inner and outer layers both being formed of a major portion of cross-linked chlorinated polyethylene.

6. In an automobile air conditioner comprising a compressor, a condenser and an evaporator connected together in a closed refrigerant flow circuit by means of conduit members, and a suitable halogenated aliphatic hydrocarbon refrigerant flowing within said circuit in the operation of said air conditioner; an improved conduit member which is a hose comprising an inner tubular refrigerant contacting layer having low permeability with respect to said refrigerant, an outer layer of an engine oil- and moisture-resistant synthetic polymer and an intermediate layer of braided fibers adapted to reinforce said inner layer against the pressure exerted by said refrigerant, said inner and outer layers both being formed of a material selected from the group consisting of cross-linked chlorinated polyethylene and mixtures of at least 85% by weight cross-linked chlorinated polyethylene and up to 15% by weight of a material selected from the group consisting of acrylonitrile-butadiene rubber, chlorinated butyl rubber, chlorosulfonated polyethylene, neoprene and polyepichlorohydrin.

References Cited

UNITED STATES PATENTS

| | | | |
|---|---|---|---|
| 2,831,327 | 4/1958 | De Beaubien | 62—244 |
| 3,011,525 | 12/1961 | Randle | 138—126 |
| 3,068,906 | 12/1962 | Rittenhouse | 138—126 |

MEYER PERLIN, Primary Examiner

U.S. Cl. X.R.

62—243, 244; 138—126; 260—94.9